United States Patent [19]
O'Neill

[11] Patent Number: 5,941,594
[45] Date of Patent: Aug. 24, 1999

[54] PROTECTIVE COVER FOR VEHICLES

[76] Inventor: Rory Francis O'Neill, Manor Farm, Ashford Road, Laleham, Staines TW18 1X, Middlesex, United Kingdom

[21] Appl. No.: 08/914,249

[22] Filed: Aug. 19, 1997

[30] Foreign Application Priority Data

Aug. 19, 1996 [GB] United Kingdom ............... 9617388

[51] Int. Cl.$^6$ ....................................................... B60J 7/20
[52] U.S. Cl. ............... 296/136; 160/370.21; 160/370.22; 160/370.23; 150/166
[58] Field of Search .................... 296/136, 168, 296/163; 160/370.21, 370.22, 370.23; 150/166; 52/3

[56] References Cited

U.S. PATENT DOCUMENTS

| | | | |
|---|---|---|---|
| 4,294,483 | 10/1981 | Ferris | 296/136 |
| 4,784,215 | 11/1988 | Sing | 160/370.21 |
| 5,176,421 | 1/1993 | Fasiska | 296/136 |
| 5,242,206 | 9/1993 | Heck | 296/136 |
| 5,350,000 | 9/1994 | Wang | 296/136 |
| 5,516,181 | 5/1996 | Thompson | 296/98 |
| 5,518,289 | 5/1996 | Cobble | 296/136 |

FOREIGN PATENT DOCUMENTS

| | | | |
|---|---|---|---|
| 2673438 | 9/1992 | France | 52/3 |
| 2747-603 | 4/1979 | Germany | 296/136 |
| 3928-695 | 3/1991 | Germany | 296/136 |
| 4316504 | 11/1994 | Germany | 296/136 |
| 55-94813 | 7/1980 | Japan | 296/136 |
| 58-214415 | 12/1983 | Japan | 296/136 |
| 893-600 | 12/1981 | Russian Federation | 296/136 |

*Primary Examiner*—Joseph D. Pape
*Assistant Examiner*—Kiran Patel
*Attorney, Agent, or Firm*—Sughrue, Mion, Zinn, Macpeak & Seas, PLLC

[57] ABSTRACT

A protective cover for a vehicle has a portion of sheet material and a number of inflatable bags. The cover is fixed to the vehicle by suitable means, for example hooks or elastic ties and the bags are inflated to space the sheet material a distance from the body of the vehicle. The position of the inflatable bags may be adjusted to allow the cover to be used with various vehicle body shapes. Means may be provided for simultaneous inflation or deflation of the inflatable bags. By spacing the sheet material from the body of the vehicle the cover affords a degree of protection to the vehicle from falling projectiles and other such hazards.

21 Claims, 5 Drawing Sheets

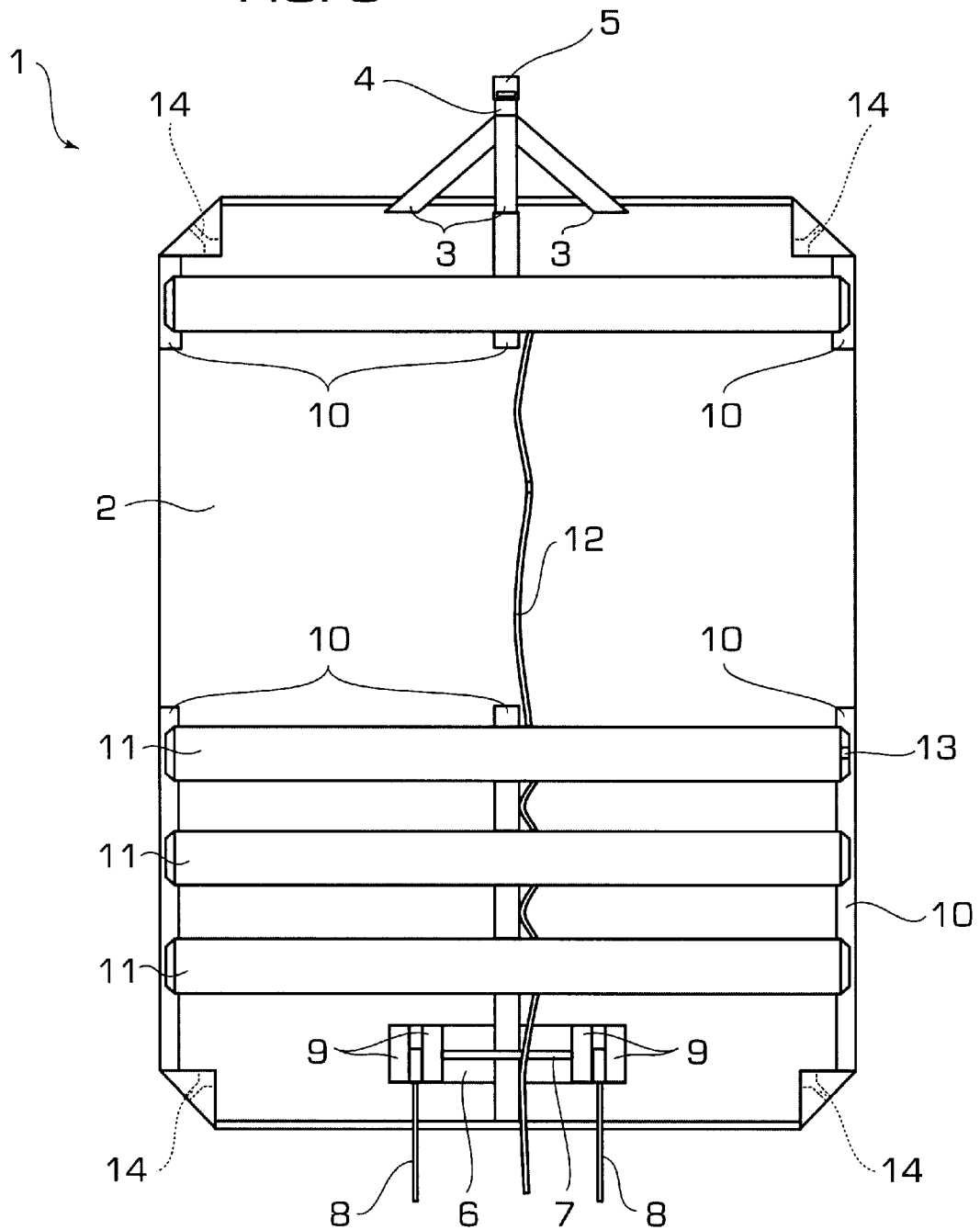

PROTECTIVE COVER FOR VEHICLES

BACKGROUND OF THE INVENTION

The present invention relates to protective covers for vehicles. Known basic vehicle covers are often comprised of a piece of sheet material and fastening means in the form of a number of ties for attaching it to a vehicle.

While covers of this type are adequate for preventing dust, liquids or other contaminants from coming into contact with the vehicle, they afford little protection against damage which can result from falling objects or debris, such as hailstones or ash, striking the vehicle. In certain climates where hailstones can be of a considerable size, a significant amount of damage can be caused in a short period.

SUMMARY OF THE INVENTION

It is an object of the present invention to provide a protective vehicle cover capable of shielding at least part of the vehicle from falling projectiles or other such hazards.

It is a further object of the present invention to provide a protective vehicle cover which can be erected and secured to the vehicle in a short space of time and with the minimum of effort. Similarly it should be possible to remove and store the cover quickly and easily.

It is another object of the present invention to provide a protective vehicle cover which occupies a small amount of space in storage so that it may be carried and stored in the vehicle.

It is yet another object of the present invention to provide a protective vehicle cover which has an adjustment means allowing it to be used with a wider range of vehicles than would otherwise be possible.

Other objects of the invention are that the cover should be lightweight and have a low manufacturing cost.

In accordance with one aspect of the present invention there is provided a protective cover for a vehicle including a portion of sheet material and a plurality of inflatable bags which are positionally adjustable with respect to the sheet material.

In accordance with another aspect of the present invention there is provided a protective cover for a vehicle including a portion of sheet material and a plurality of elongated inflatable bags arranged with their longer side transverse to the cover.

In accordance with yet another aspect of the present invention there is provided a protective cover for a vehicle including a portion of sheet material and a plurality of inflatable bags attached at their ends and optionally also intermediate their ends to the sheet material.

In accordance with another aspect of the present invention there is provided a protective cover for a vehicle including a portion of sheet material and a plurality of inflatable bags having a common gas line for inflation of the bags by admitting gas and/or deflation of the bags by exhausting gas and a common deflation point.

The inflatable bags may have a length equal to the width of the cover and be arranged in a direction transverse to the cover.

The plurality of inflatable bags can be removable attached to the cover, in which case a plurality of strips extending in the longitudinal direction of the sheet may be fixed thereon for allowing the inflatable bags to be arranged in a number of locations along the length of the cover.

It is preferable that a waterproofing treatment is applied to one side of the sheet material.

The cover may include one or more panels permanently or removably attached thereto.

BRIEF DESCRIPTION OF THE FIGURE

The present invention will now be described in detail with reference to and in connection with the accompanying drawings wherein:

FIG. 3 is an underside view of a car cover in accordance with the present invention suitable for use with pick-up type vehicles.

DETAILED DESCRIPTION OF THE PREFERRED EMBODIMENT

Figure 1:
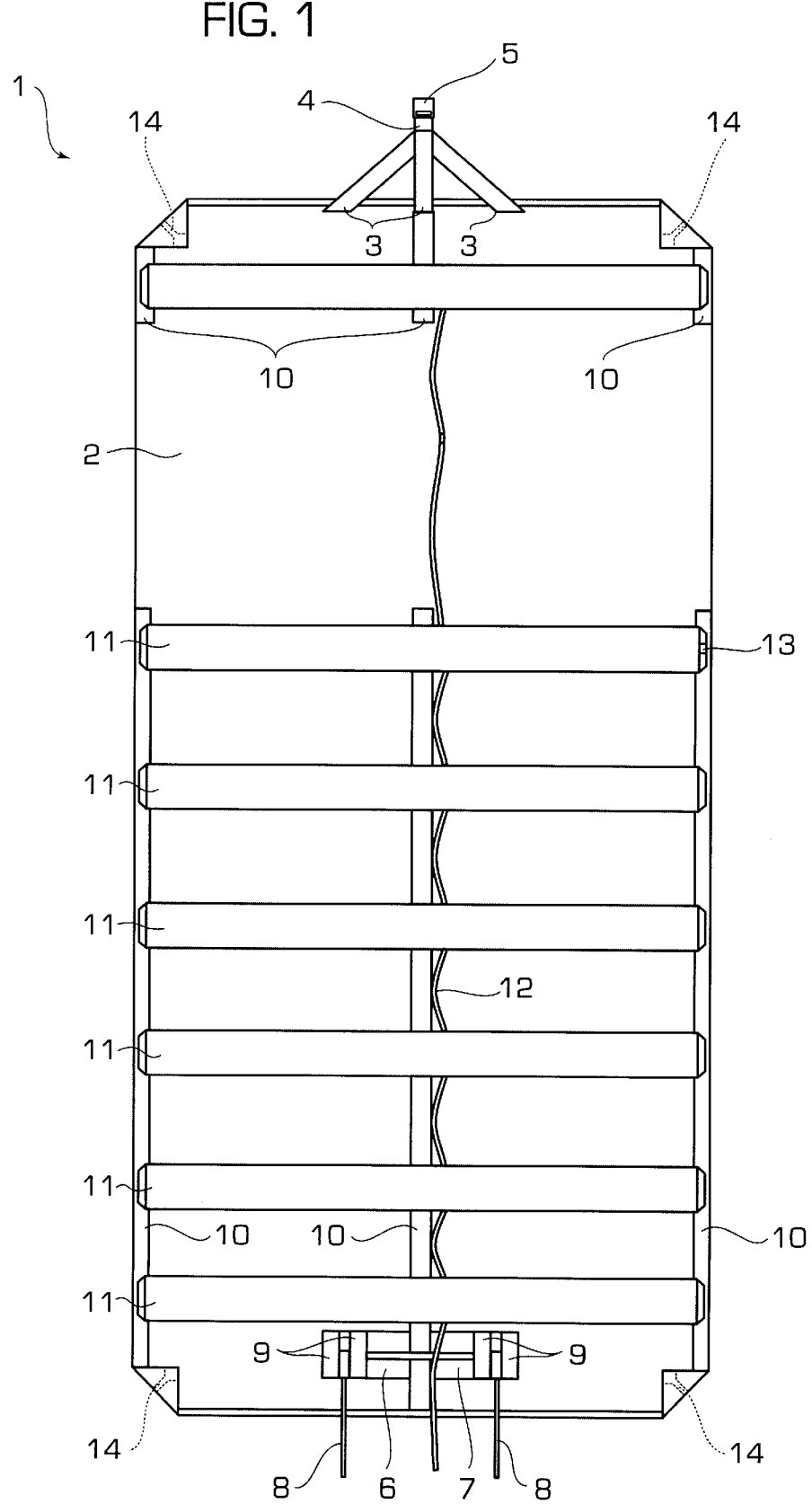
FIG. 1 is an underside view of a car cover in accordance with the present invention suitable for use with estate cars.

Referring to FIG. 1 a protective cover 1 has dimensions suitable for covering a car having an estate bodyshape. A generally rectangular shaped base 2 is comprised of a sheet of woven material e.g polyester or polyamide, which has been treated or laminated on one side, in this case the outside of the cover, with a waterproofing material e.g. P.V.C. Alternative sheet materials could be used providing that they are resistant to tearing and resistant to stretching. In one arrangement, the base 2 may be comprised of nylon backed polyurethane.

At a front first end of the cover there is provided a first fixing means comprising of three ligaments in the form of nylon webbing strips 3 each of which is stitched at one end to the cover, the other three ends joined to a linking portion 4 of 50 mm wide triple stretched elastic and a heavy duty elastic front hook 5. The hook is attached to an end of the linking portion 4 remote from the nylon webbing strips 3.

Towards a rear second end of the cover there is provided a second fixing means comprising of a panel 6, a rod 7 and two elastic cords 8. The panel 6 is made from a double thickness of the sheet material treble stitched thereto, though an alternative material could be used. A number of loops 9 are permanently fastened on top of the panel 6 allowing the rod 7 to be passed into the loops and retained against the panel 6. Each of the elastic cords is secured by tying one of its ends around the rod 7.

Fixing strips 10 are provided and are arranged to extend in a longitudinal direction with respect to the sheet 2 along the centre of the sheet and at each of its longitudinal edges. The strips 10 are fixed to the sheet 2 by using any suitable method, for example, by stitching, welding or use of an adhesive.

A plurality of inflatable bags in the form of tubes 11 each having a length equal to the width of the sheet are arranged transversely thereon such that each tube contacts each of the fixing strips 10. Each tube 11 is secured at its centre and ends to the strips 10 by nylon cord ties which are laced through the fixing strips and tied around the tubes 11. Any suitable alternative securing means could be used, for example, by employing Velcro fasteners between the strips 10 and the tubes 11 as long as it allows the tubes 11 to be re-positioned at will by a certain extent along the length of the cover 1. Other alternatives include zippers or press studs.

A common gas line 12 connects each adjacent tube 11 in sequence to facilitate simultaneous inflation of each tube with one operation, while a common deflation valve 13 is located on the side of the cover which corresponds to the drivers side when the cover is mounted on the vehicle. The valve allows gas to be exhausted from all of the tubes by virtue of the common gas line 12. An excess length of gas line is provided between each adjacent tube 11 allowing them to be moved with respect to one another.

Figure 4A:
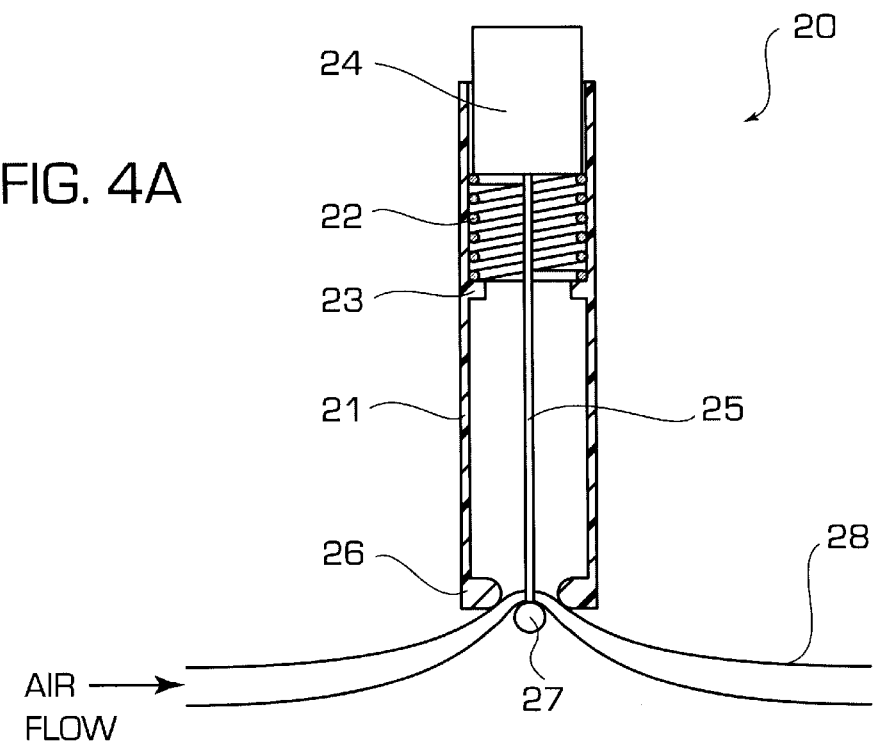
FIGS. 4a and 4b show a clamp suitable for restricting the flow of gas through a gas line.
Figure 4B:
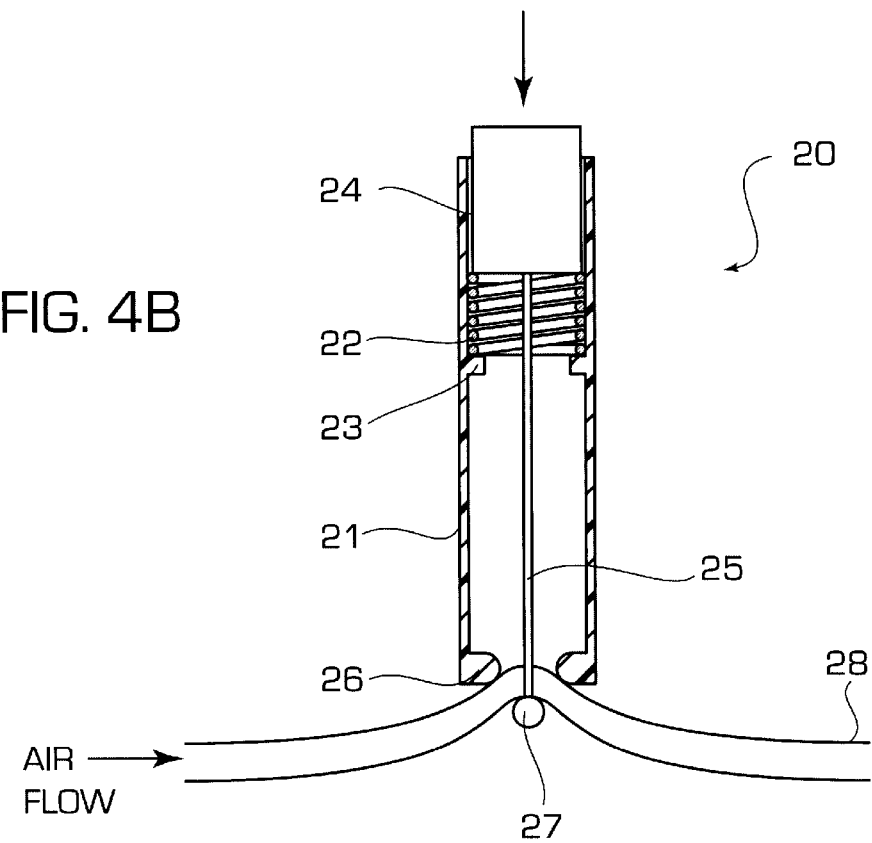

Various methods may be used to control the flow of gas into the inflatable tubes via the common gas line and one such method employs the device illustrated in FIGS. 4a and 4b. A clamp 20 includes a hollow body 21 which houses a spring 22 supported on abutment means 23 inside the body 21. At one end of the body a plunger 24 which is supported by the spring 22 is attached to a rod member 25 that extends within the body 21 along its length. A restricting means is provided in the form of shoulders 26 formed at the other end of the body and finger 27 attached to an end of the rod member 25 remote from the plunger. The spring biases the rod to a position as shown in FIG. 4a such that the finger 27 is held proximate to the shoulders 26. When the plunger is depressed the finger 27 is spaced apart from the shoulders 26, as illustrated in FIG. 4b. In use, a portion of resiliently deformable tubing 28, which may be part of the gas line 12 or an extra portion of tubing attached thereto, is introduced into the space defined between the shoulders 26 and finger 27 when the plunger is depressed. When the plunger is released the spring 22 forces the finger 27 back towards the shoulders 26 to compress the tubing 28 such that it is radially deformed. By using tubing 28 having suitable physical properties, that is, tubing capable of undergoing resilient deformation in the radial direction, gas flow through the tube 28 is restricted.

Figure 2:
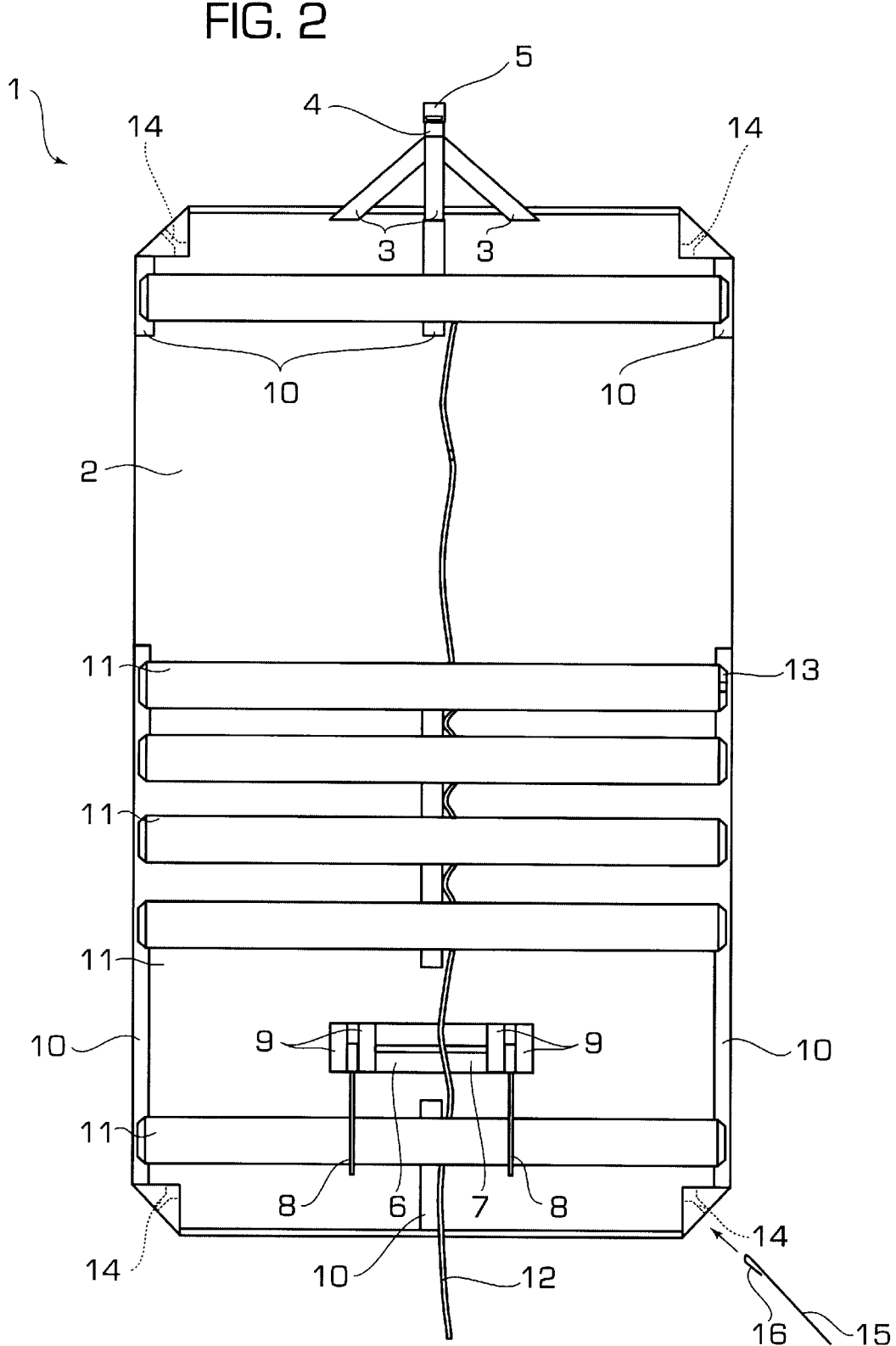
FIG. 2 is an underside view of a car cover in accordance with the present invention suitable for use with saloon cars.

The corners of the cover may be attached to the vehicle by means of auxiliary fixing means. With reference to FIG. 2, in one arrangement each corner of the cover includes an aperture 14 of a size suitable for receiving an elastic cord 15. The cord is threaded through the hole and the end of the cord doubled back on itself before bonding with PVC tape or stitched or tied. The wider cross sectional area formed by the doubled back portion 16 of the cord prevents it passing back through the aperture. For reasons of clarity the cord 15 is shown detached from the cover 1. Although the cord is illustrated in FIG. 2 only, the fixing means is employed at each corner of all of the covers in FIGS. 1, 2 and 3. Further auxiliary fixing means may be provided at other locations of the cover.

In use the cover is fully opened up and placed over the top of vehicle such that the hook 5 is proximate to the front of the vehicle, the elastic cords 8 are at the rear and the inflatable tubes 11 on the underside of the cover in contact with the vehicle. The heavy duty hook 5 is secured to a convenient part of the vehicle such as the front bumper or radiator grille before pulling the rear end of the cover in a direction towards the lower rear of the vehicle where it is secured using the elastic cords 8 such that the cover is taught. Each corner of the cover may be attached to a corresponding corner of the vehicle by the elastic cords 15.

If necessary the position of each of the inflatable tubes 11 can be adjusted so that they are evenly distributed over the roof section of the vehicle and where appropriate, depending of the design of the vehicle, where the cover meets the bodywork of the vehicle at the front and rear. This operation only needs to be performed once if the cover is always used with the same vehicle.

Figure 5:
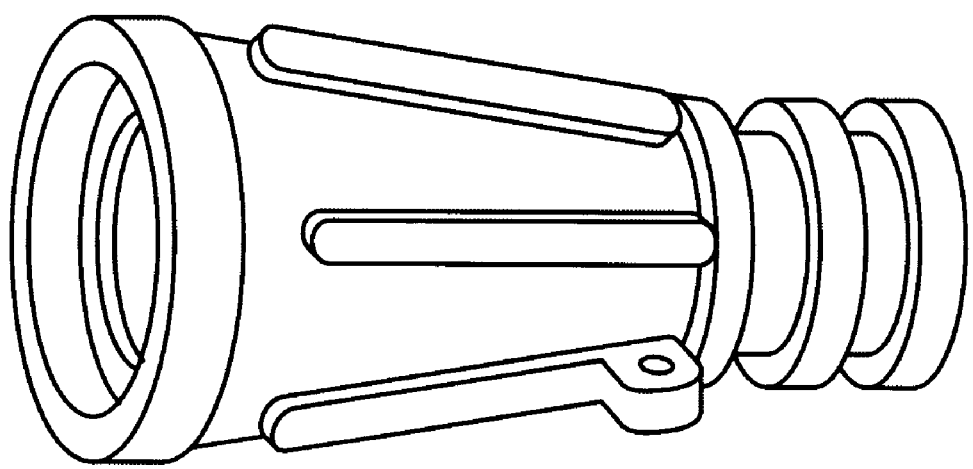
FIG. 5 shows a connector suitable for attaching to the end of a vehicle exhaust pipe.

Finally the tubes 11 are inflated by admitting gas into them under pressure via the common gas line 12. In practice the gas is most likely to be air provided by a compressed air canister or by drawing some air from one of the vehicles tyres until the tubes 11 are fully inflated and lift the cover material 2 away from the body of the vehicle. However the gas could be provided from some other source, for example the vehicles exhaust pipe. FIG. 5 shows a suitable connector "funnel" designed to be fitted to the end of the vehicle's exhaust pipe. When using gases from the exhaust pipe for filling the tubes 11, it may be necessary to provide a lengthy of hose which is capable of withstanding the high temperatures of the exhaust gases for joining the connector funnel to the gas line 12. When the cover is used correctly there should be no contact between the vehicle and the cover material 2 except possibly in those regions where the cover is fixed to the vehicle, the cover thereby providing an air space between the cover and vehicle. Should a hailstone or the like fall on the outside of the cover its impact energy will be absorbed by temporary flexing of the cover material 2 or deformation of the tubes 11 rather than being wholly transmitted to the bodywork of the vehicle. In one arrangement, the dimensions of the tubes are such that when correctly inflated, they have a diameter of approximately 4 inches. Tubes of this size provide adequate spacing between the majority of the cover material 2 and the car body, although it will be appreciated that tubes of other suitable dimensions may be used.

Removal of the cover is performed by exhausting air from the tubes 11 through the common deflation valve 13 prior to untying and unhooking the cover from the vehicle. The cover may then be folded up and stored. The elastic portion 4 and the elastic cords 8 cause the cover 2 to be tensioned whilst fitted to the vehicle. This tensioning effect can be used to advantage during the exhaustion process to squeeze the air or gas out of the tubes 11. Further tensioning may also be provided by the elastic cords 15 of the auxiliary fixing means which further aids the exhaustion process.

FIGS. 2 and 3 show covers for saloon and pick-up type vehicles respectively which differ from the cover shown in FIG. 1 as described above only in the dimensions and the number and arrangement of the inflatable tubes 11. Similar reference numerals are used where appropriate.

In saloon cars and estates, the cover can be permanently fixed on the underside of the boot by the two elastic cords. The cover is then rolled over the car from the boot to the front in its folded state. This holds the cover on the car in windy weather. The front clip is fixed and the two corner hooks, the driver then returns to the boot and fills the tubes with air from the spare tyre, or air can, or gas from some other source. The cover then unfolds itself with the air filling the tubes, and the driver has only to close the boot, which stretches the cover, and fix the back hooks. The cover is designed so the driver only has to make one trip to the front of the car. In a hail storm, the quicker the cover is deployed the better, as the driver is unprotected until he re-enters the car.

In each of the car covers described herein and the various arrangements, it may be advantageous to provide a one-way valve for preventing the air or gas present in the tubes 11 from escaping via the common gas line 12. The one-way valve would aid the inflation process and may additionally serve to contain the air or gas within the tubes while the cover is in use. This would eliminate the need to provide a separate means for keeping the air or gas within the tubes 11 one they had been inflated, as well as the need for the user to perform a separating "plugging" procedure of the gas line.

The cover may also be provided with an over-pressure relief valve in fluid communication with the interior of the tubes 11 or the common gas line 12 for preventing over inflation of the tubes 11.

Where a common gas line 11 is not provided, one or more of the tubes 11 may be provided with an individual one-way valve and/or over-pressure relief valve.

While the present invention has been described with reference to the specific embodiments above, other modifications could be made without departing from the scope of the present invention. For example permanent fixing of the components may be accomplished by a variety of methods such as stitching, welding, use of adhesives or other suitable alternatives. Temporary fixing could be effected by appropriate methods for example by use of press fasteners, zippers, lacing or Velcro. Various components of the cover could be made from suitable materials which are different to those specifically mentioned. The cover may include detachable or fixed side panels for covering a greater area of the vehicle body. In some instances it may be adequate that the bags are permanently fixed to the cover if the cover is intended to be used with one design of vehicle only, for example where the cover is supplied with the vehicle. It will be appreciated that the car cover of the invention allows air to flow over the car, thereby avoiding build up of condensation. The cover also provides protection against the sun.

I claim:

1. A protective cover for a vehicle, said cover including a portion of sheet material, a plurality of inflatable bags, means connecting an interior of each bag to a common gas line for admitting or exhausting a volume of gas, and means for positionally adjusting the bags along the length of the cover.

2. A protective cover of claim 1 wherein the inflatable bags are of elongate shape arranged with their longer side transverse to the cover.

3. A protective cover of claim 2 wherein the plurality of inflatable bags are attached at least at their ends to the sheet material.

4. A protective cover of claim 1, wherein each inflatable bag has a gas valve fitted in a wall thereof.

5. A protective cover of claim 1 having a common gas line for inflation of the bags by admitting gas and/or deflation of the bags by exhausting gas and a common deflation point.

6. A protective cover of claim 1 wherein each inflatable bag has a length equal to the width of the cover and is arranged in a transverse direction with respect to the cover.

7. A protective cover of claim 1 wherein the one or more inflatable bags are comprised of a number of inflatable chambers capable of accepting a volume of gas.

8. A protective cover of claim 1 wherein the cover is provided with a means for removably attaching it to the vehicle.

9. A protective cover of claim 8 wherein the means for removably attaching the cover to the vehicle includes a fastening means located towards a front end of the cover.

10. A protective cover of claim 9 wherein the fastening means comprises one or more flexible ligaments each having a first end fixed at the proximity of the front end of the cover and a second end attached to a portion of elastically extendible material and hook means fastened to the elastically extendible material at a section remote from the attachment of the one or more flexible ligaments with the elastically extendible material.

11. A protective of claim 8 wherein the means for attaching the cover to the vehicle includes a fastening means located towards a rear end of the cover.

12. A protective cover of claim 11 wherein the fastening means comprises a panel fixed towards the rear end of the cover and having loops, a rod removably retained against the panel by the loops and one or more elastic cords each secured by one end to the rod.

13. A protective cover of claim 8 wherein the means for attaching the cover to the vehicle includes an auxiliary fixing means for securing corners of the cover to the vehicle.

14. A protective cover of claim 1 comprising means for removably attaching the inflatable bags to the cover.

15. A protective cover of claim 14 and further comprising a plurality of strips permanently fixed to the sheet material of the cover and a means to removably fix the plurality of inflatable bags thereto.

16. A protective cover of claim with claim 15 wherein the means to removably fix the inflatable bags comprises cord ties fastened to the strips and tieable around the inflatable bags.

17. A protective cover of claim 15 wherein the means to removably fix the inflatable bags comprises Velcro attached to the strips and the plurality of inflatable bags.

18. A protective cover of claim 15 wherein the plurality of strips extend in the longitudinal direction of the sheet material allowing the inflatable bags to be arranged in a number of locations along the length of the cover.

19. A protective cover of claim 18 wherein the strips are located at each longitudinal edge and in the centre of the sheet material.

20. A protective cover of claim 1 wherein the side of the sheet material remote from the plurality of inflatable bags has undergone a waterproofing treatment.

21. A protective cover of claim 1 and further comprising one or more permanently or removably attached panels to increase the area of the vehicle that is covered.

* * * * *